UNITED STATES PATENT OFFICE.

GEORGE GUSTAV SCHOBERT, OF BIRMINGHAM, ENGLAND.

PAINT FOR SHIPS' BOTTOMS.

No. 854,241.

Specification of Letters Patent.

Patented May 21, 1907.

Application filed November 7, 1905. Serial No. 286,205.

*To all whom it may concern:*

Be it known that I, GEORGE GUSTAV SCHOBERT, a subject of the King of Great Britain, residing at 35 Carlyle Road, Edgbaston, Birmingham, in the county of Warwick, England, chemist, have invented a new and useful Improvement in Paint for Ships' Bottoms, Harbor Works, and the Like, of which the following is a specification.

This invention relates to an improved paint or composition for preventing the fouling of iron and steel ships' bottoms and other submerged surfaces, and for preserving them and protecting them against the adhesion and growth of marine, animal and vegetable life and corrosion.

The composition consists of the ingredients hereinafter named. The following proportions are those which give the best results in practice, their proportions may however be varied without departing from my invention, according to the trade in which the ships to be coated may be employed, or otherwise according to circumstances. 1. Benzolin, methylated spirit or solvent naphtha 50 parts. 2. Rosin or asphalt 35 parts. 3. Shellac or gum kauri & the like 10 parts. 4. Oxid of zinc previously ground in linseed oil 40 parts. 5. Arsenite of lime previously ground to a paste with linseed oil (boiled or raw) or other oxidizing oils 100 parts.

The process of mixing and preparing my anti-fouling and preservative paint is as follows:—First melt together Nos. 2 and 3. and when cooled down to about 280 to 300 degrees Fahrenheit carefully mix in it about half of No. 4. until the gum mixture begins to rise, and when in a perfectly cold state dissolve this foregoing mixture in No. 1. When the gums are dissolved, add the rest of No. 4. Lastly add No. 5 and mix the whole well together for about 12 hours. After standing for about 12 hours the composition is fit for use.

If different shades of color are required add coloring materials such as oxid of iron, umber or the like.

The arsenite of lime paste is previously to adding it to the mixture, placed in shallow pans and put in a chamber for about 48 hours heated to about 200 degrees Fahrenheit.

What I claim then is:—

1. Paint for ships' bottoms, harbor works and the like, consisting in the combination of arsenite of lime previously ground to a paste with oxidizing oil, and media for coloring and binding, substantially as set forth.

2. Paint for ships' bottoms, harbor works, and the like, consisting in the combination of arsenite of lime previously ground to a paste with linseed oil, and media for coloring and binding, substantially as set forth.

3. Paint for ships' bottoms, harbor works, and the like, consisting in the combination of arsenite of lime previously ground to a paste with oxidizing oil, varnished gum and a solvent of such gum.

4. Paint for ships' bottoms, harbor works, and the like, consisting in the combination of arsenite of lime previously ground to a paste with oxidizing oil, rosin, shellac, oxid of zinc ground in oxidizing oil, and a solvent of the varnish gums.

In testimony whereof, I have signed my name to this specification in the presence of two subscribing witnesses.

GEORGE GUSTAV SCHOBERT.

Witnesses:
 HAROLD J. C. FORRESTER,
 STANLEY BANNER.